United States Patent [19]

Nakagawa

[11] 4,039,194
[45] Aug. 2, 1977

[54] AUTOMATIC RECORD PLAYER

[75] Inventor: Takamichi Nakagawa, Katano, Japan

[73] Assignee: Matsushita Electric Industrial Co., Ltd., Osaka, Japan

[21] Appl. No.: 561,348

[22] Filed: Mar. 24, 1975

[30] Foreign Application Priority Data

Mar. 29, 1974 Japan .................. 49-36304
Dec. 6, 1974 Japan .................. 49-140914

[51] Int. Cl.² ............................ G11B 17/16
[52] U.S. Cl. ........................... 274/10 R
[58] Field of Search ............... 274/10 R, 15 R, 39 R, 274/39 A, 1 R, 9 R, 9 B, 9 RA, 15 A

[56] References Cited

U.S. PATENT DOCUMENTS

| 2,145,743 | 1/1939 | Welch | 274/1 R |
|---|---|---|---|
| 2,511,604 | 6/1950 | Stolberg | 274/10 R |
| 3,460,840 | 8/1969 | Koepke | 274/10 R |
| 3,462,158 | 8/1969 | Tatter | 274/10 R |
| 3,671,045 | 6/1972 | Barn | 274/15 R |
| 3,822,889 | 7/1974 | Nakagana | 274/10 R |
| 3,827,697 | 8/1974 | Miyoshi | 274/10 R |

Primary Examiner—Harry N. Haroian
Attorney, Agent, or Firm—Stevens, Davis, Miller & Mosher

[57] ABSTRACT

An automatic record player comprising: a switch lever for turning on a switch for energizing a motor by manually moving a starting lever to the starting side; a pickup-fixing plate for operating the switch lever to turn on the switch when the pickup arm is manually brought to a position from which record-playing starts; an automatic record-playing mechanism for automatically bringing the pickup arm to the starting position when the starting lever is moved to the starting side and for automatically returning the pickup to its home position upon completion of record playing; a record changer mechanism for dropping a plurality of records set around a changer spindle onto a turntable one by one in cooperative relation with the automatic record-playing mechanism; and a repeating mechanism for setting the number of operations of the automatic record-playing mechanism and the record changer mechanism to be repeated; thereby enabling the player to perform automatic playing of a single record, automatic sequential playing of a plurality of records by mounting the changer spindle, manual playing of a record by manually bringing the pickup arm to the starting position, automatic repeat playing a desired number of times of a single record by using the repeating mechanism, and automatic sequential playing of a desired number of records of all records set around the changer spindle by use of the repeating mechanism.

6 Claims, 11 Drawing Figures

AUTOMATIC RECORD PLAYER

BACKGROUND OF THE INVENTION

This invention relates to an automatic record player provided with a record changer mechanism. In particular, it relates to a mechanism which is capable of automatically repeating the playing of a single record.

The prior art automatic record players may be classified into three categories i.e., a semi-automatic type, in which a pickup arm is automatically returned to a receiving stand upon completion of a cycle of record playing and in which the pickup arm is manually brought to a record-playing-starting position for starting record-playing and thereafter the pickup arm is brought to a record-playing-completing position; a fully automatic type, in which the operation of a starting lever commences the automatic record-playing and, upon completion of the record-playing, the pickup arm is automatically returned to the receiving stand position; and a continuous record-playing type, in which a changer spindle is mounted on the second type player to permit continuous record-playing of a plurality of record discs. Among these types, the third is most convenient because the record playing may be effected by bringing the pickup arm to its record-playing position manually, because the starting lever is operated to effect the ensuing automatic record playing or because a plurality of record discs may automatically but continuously be played by using a changer spindle.

However, most prior automatic record players of the type provided with a record changer mechanism have merely performed, when playing a single record, automatic playing of a single round or automatic playing which is repeated until a turn-off lever is manipulated. In another case wherein a plurality of records are played using the changer spindle, automatic sequential playing continues until all records set around the changer spindle are delivered onto the turntable.

It is an object of the present invention to provide an improved automatic record player provided with a repeating mechanism which makes it possible to repeat record-playing of a desired number of rounds as previously set. In accordance with the present invention, if a single record is put on the player, the record will be repeatedly played the same number of rounds as was previously set on the repeating mechanism. If a plurality of records are set on the player, records of the number corresponding to the number as previously set on the repeating mechanism will be sequentially played one by one.

Other objects, features and advantages of the present invention will be apparent from the following description in conjunction with the accompanying drawings.

Figure 1:
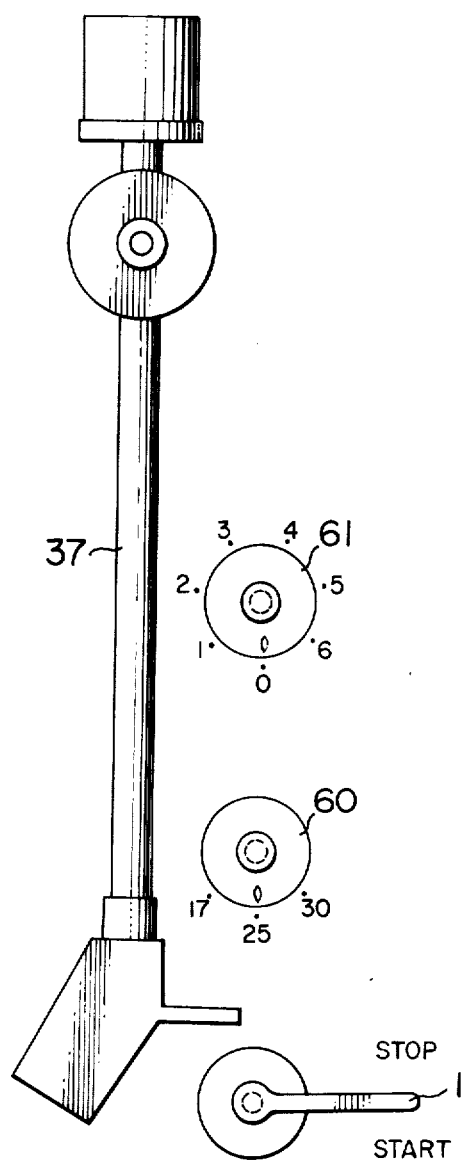
FIG. 1 is an outline of a top view of an automatic record-player, illustrating the relationship between a pickup arm and its manipulating portion in one embodiment of an automatic record player according to the present invention.

Referring to FIGS. 1 through 8, shown at 1 is a starting lever which is moved, upon starting and stopping of the automatic record-playing, with its one end being secured to a starting lever shaft 2. Shown at 3 is a starting cam which is fixedly mounted on the shaft 2 in its middle portion and thus rotatable about the shaft 2, and the cam 3 is formed with projections 4, 5 on its opposite sides. Shown at 6 is a stop plate which is slidable in the direction in which the plate 6 is guided by a guide shaft 9 provided separately from the aforesaid shaft 2, while a spring 7 spans between the stop plate 6 and the starting cam 3 in such a manner that both are pulled together. Shown at 8 is a switch cover attached to a stationary base plate, and the cover 8 houses therein a switch 10 which is secured thereto by means of a screw 11 and adapted to control the rotation of a motor M. Shown at 12 is a first starting plate with its one end pivoted to the starting cam 3, while a second starting plate 13 is slidable on the other end portion of the plate 12 along the length thereof. Shown at 14 is a repeating cam which governs the continuous record-playing R.P.M. for a single record disc and the continuous playing of a plurality of record discs fitted on a spindle 98, and which is rotatable about a shaft 15 serving as a guide for the second starting plate 13. Shown at 16 is a starting-setting plate which is adapted to slide along the length thereof, with the rotation of the repeating cam 14. Shown at 17 is a tension spring secured to the first and second starting plates 12, 13 therebetween. Shown at 18 is a projection formed on the second starting plate 13, and the projection 18 is adapted to abut the projection 19 formed on the repeating cam 14, when the second starting plate slides in the direction of arrow D, thereby rotating the cam 14 in the direction of arrow E. Designated 20 is a trifurcated switch lever, with one of its three legs being formed with a sloped face 21 and with the second leg being formed with a projection 22. The switch lever 20 is pivoted on a shaft in its center 23, with the third leg being adapted to be urged by the starting-setting plate 16. Represented by 24 is a first starting plate means pivoted on a shaft 27, while a second starting plate means 25 is secured to one end of the plate 24 by means of an eccentric shaft 26. Shown at 28 is a tension spring (which will be referred to as starting spring, hereinafter) which is tension-loaded normally, and the starting spring 28 is secured to the starting plate means 24, 25. Furthermore, the starting spring 28 is adapted to abut the tip of the stopping plate 6, when the stop plate 6 slides in the direction C, thereby rotating the starting plate means 24, 25 in the direction H. Shown at 29 is a large size gear pivoted on a shaft 30 in its center, having a portion devoid of teeth. A starting link 31 and a friction link 32 are pivoted to the large size gear 29 in the position close to the portion devoid of teeth by means of a link shaft 33. Shown at 34 is a small size gear rotatably mounted on a turntable shaft 35, and the small size 34 is formed with a ratchet which rotates integrally with the gear 34. Shown at 37 is a pickup arm which is secured to a rotary shaft 38 at its one end, while there is secured to the rotary shaft 38 a pickup movable plate 39 having a starting pin 40 and a movable pin 41. Shown at 44 is a drive plate which is slidable along the length thereof, being guided by a shaft 46, and the drive plate 44 has at its one end a drive pin 43 which is fitted in a cam groove 42 defined in one side surface of the large size gear 29, and the plate 44 further has a pin 45 in the position opposing the starting spring 28 secured to the starting plate means 24, 25. Shown at 47 is a lift adapted to move the pickup arm 37 upwards and downwards, and the lift 47 is secured to a lift shaft 48 in its middle portion. Shown at 49 is a lift cam formed on the drive plate at its end, so that when the drive plate 44 slides in the direction of arrow 0, the lift shaft 48 abuts the lift cam 49 to move the lift 47 upwards. Shown at 50 is a connecting pawl pivoted to the end portion of the drive plate 44, while a spring 52 is secured to the connecting pawl 50 and drive plate 44 at its opposite ends, thereby normally urging the connecting pawl 50 against the ratchet gear 53 which rotates together with cam 14. Shown at 54 is a movable plate which is pivoted to the end portion of the drive plate 44 in a position opposed to pins 40, 41 on the pickup movable plate 39, and the movable plate 54 is rotatable about a shaft 55 under the control of a ball 56 and a spring 57. Shown at 58 is a selecting knob shaft, on which is mounted a selecting knob 60 adapted to set the size of a record disc to be played. Also mounted on the selecting knob shaft 58 is a selecting cam 59. Shown at 62 is an index plate pivoted to the shaft 46 its center portion, and the index plate 62 is formed with shoulder portions d, e, f in the position facing the pickup movable-plate 39 attached to the rotary shaft of the pickup arm 37, while the index plate is formed with a bent portion 63 at the other end thereof. Shown at 64 is an auxiliary plate which is adapted to move relative to the index plate 62, with a spring 65 spanning between the auxiliary plate 64 and the index plate 62. Shown at 66 is a selecting lever which is slidable along the length thereof, being guided by shafts 46, 58 by manipulating the selecting knob 60, and the selecting lever 66 is formed with shoulder portions a, b, c in positions opposing the bent portion 63 of the index plate 62. Shown at 67 is a pickup fixing plate which is secured to the rotary shaft 38 of the pickup arm 37, and the pickup fixing plate 67 is formed with a pin 68 at its tip. Shown at 69 is a slide piece attached to the drive plate 44, and at 70 a projection formed on the switch lever 20. Shown at 71 is a switch holding plate which is rotatably mounted on a shaft 72 so as to rotate about the shaft 72, while a spring 73 spans between the switch holding plate 71 and the projection 70. Shown at 74 is an insulating plate adapted to insulate the switch 10 housed in the switch cover 8 from the base plate 78, and shown at 75, 76, 77 are through-holes defined in the base plate 78.

Figure 8:
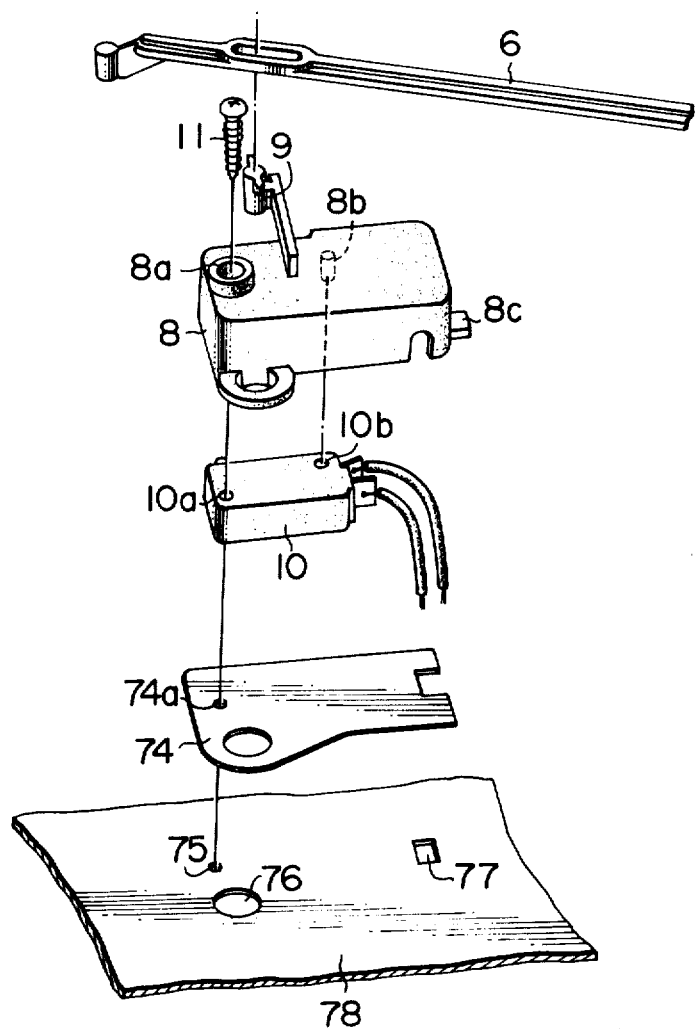
FIG. 8 is an exploded, perspective view showing a motor drive switch attached for use with the aforesaid automatic record player.

The switch 10, as shown in FIG. 8, is fixedly mounted in such a manner that the switch 10 is first housed in the switch cover 8, with one of attaching-through-holes 10b fitted on the projection 8b projecting from the inner surface of the switch cover 8, and then the attaching projection 8c on the switch cover 8 is fitted in a through-hole 77 defined in the base plate 78, after which a screw 11 is inserted through the attaching through-hole 8a in the switch cover 8, attaching through-hole 10a in the switch 10, the through-hole 74a in the insulating plate 74 and then through-hole 75 in the base plate 78, followed by tightening for securing the switch 10 in position.

Figure 11:
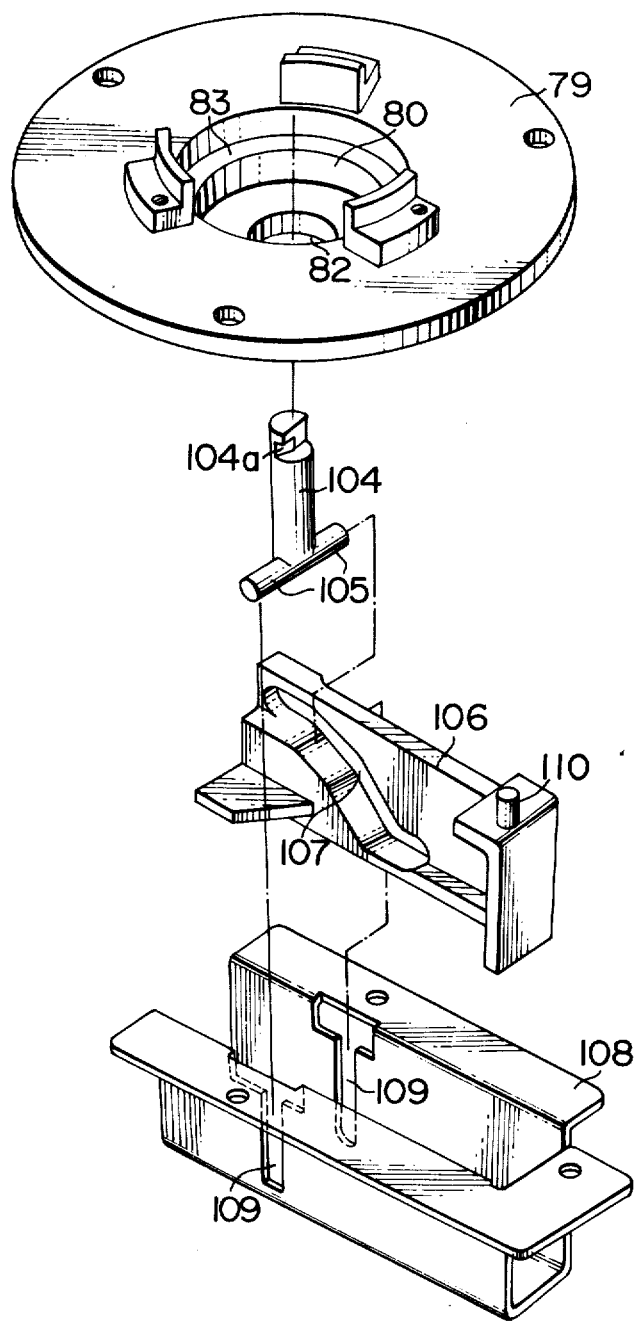
FIG. 11 is an exploded, perspective view showing the essential part of the spindle drive mechanism of FIG. 9.

Description will now be given of the spindle-attaching portion of the record changer by referring to FIGS. 9 and 11. Shown at 79 is a frame having a concave portion 80 integral therewith, while the concave portion 80 is formed, in its inner surface, with a window 81 which permits the meshing of the small size gear 34 with the larger size gear 29. The concave portion 80 is formed with a hole 82 in the bottom portion thereof in its center and with a stepped portion 83 in the upper peripheral portion thereof. Fitted fixedly in the hole 82 defined in the frame 79 is the cylindrical turntable shaft 35, on which is rotatably fitted a small size gear 34, as has been described earlier. Shown at 84 is a buffer seat of a cylindrical shape, which has a bottom and is made of resilient material such as rubber and fitted in the stepped portion 83 of the frame 79, while there is defined in the center of the bottom portion thereof a hole 86, through which the turntable shaft 35 extends. Shown at 86 is a washer of a ring form, which is seated on the bottom portion of the buffer seat 84. Placed on the washer 86 are a plurality of a ball bearings 87, on which is placed a washer 88 of a ring form to cover same. The ball bearings 87 are confined between two cylinders 89a, 89b having different diameters in a manner that the ball bearings 87 are aligned on the same circumference. Shown at 90 is a cylindrical rotary shaft having a tapered portion 93 on its outer peripheral surface, in addition to a small diameter portion 91 and a large diameter portion 92. A buffer ring 94 made of a resilient material is fitted on the stepped portion defined between the tapered portion 93 and the large diameter portion 92, the aforesaid cylindrical rotary shaft being rotatably fitted on the turntable shaft 35 which is secured to the frame 79. A small diameter portion 91 of the rotary shaft 90 is formed with a cut 91a. Thus, when the turntable shaft 35 is fitted in the rotary shaft 90, the cut 91a engages the projection 34a provided on top of the center hole in the small gear 34, thereby permitting the rotation of the rotary shaft 90 and small size gear 34 in integral fashion. Shown at 95 is a retaining ring which is fitted in a groove 35a provided in the top, outer circumference of the turntable shaft 35 for retaining the rotary shaft 90 fitted on the turntable shaft 35. Shown at 96 is a turntable, with its center tapered hole 97 being fitted on the tapered portion 93 of the rotary shaft 90, and hence the turntable 96 may rotate integrally with the rotary shaft 90. Shown at 98 is a spindle of the umbrella type, in which a holder pawl 101 adapted to hold the lowermost record disc and a clamping pawl 102 adapted to hold a record which is lowermost except one comes out or from a slit defined in the spindle body 99 due to the up and down movements of the spindle shaft 100 housed in the spindle body 99. The spindle body 99 is rigidly fitted in the center hole in the turntable shaft 35. Fitted in the lower end of the spindle shaft 100 is a connecting member 103 having a cut 103a. Thus, by bringing the cut 103a in the connecting member 103 in engagement with a cut 104a in the vertically movable shaft 104 which has been inserted into the center hole in the turntable shaft 35 from below, the spindle shaft 100 is moved up and down with the up and down movements of the vertically movable shaft 104, so that the holder pawl 101 and the clamping pawl 102 are operated, thereby effecting the record changing operation, i.e., dropping and holding a record disc.

Projecting integrally of the opposite sides from the lowermost end of the vertically movable shaft 104 are projections 105, one of which is fitted in a cam hole 107 defined in a sliding cam member 106 which reciprocates in the horizontal direction. Shown at 108 is a cam holder which is adapted to hold the sliding cam member 106 and guides the sliding movement of the member 106, and the cam holder 108 is secured to the lower portion of the frame 79. Defined on the opposite sides of the cam holder 108 therein are guide slots 109 which guide the vertical movement of the vertically movable shaft 104, with the projections 105 of the vertically movable shaft 104 in engagement with the slots 109. On the other hand, a pin 110 is integrally formed on the top end face of the sliding cam member 106 and fitted in a cam groove 111 defined in the undersurface of the large size gear 29. Description will be further given of the cam groove 111 with reference to FIG. 4. As has been described earlier, a cam groove 42 is provided in one surface of the large gear 29 in which is fitted the drive pin 43 provided on the end portion of the drive plate 44, while the cam groove 111 is defined in the other surface of the larger size gear 29. Furthermore, the drive plate 44 is placed at a right angle to the sliding cam member 106.

Figure 10:
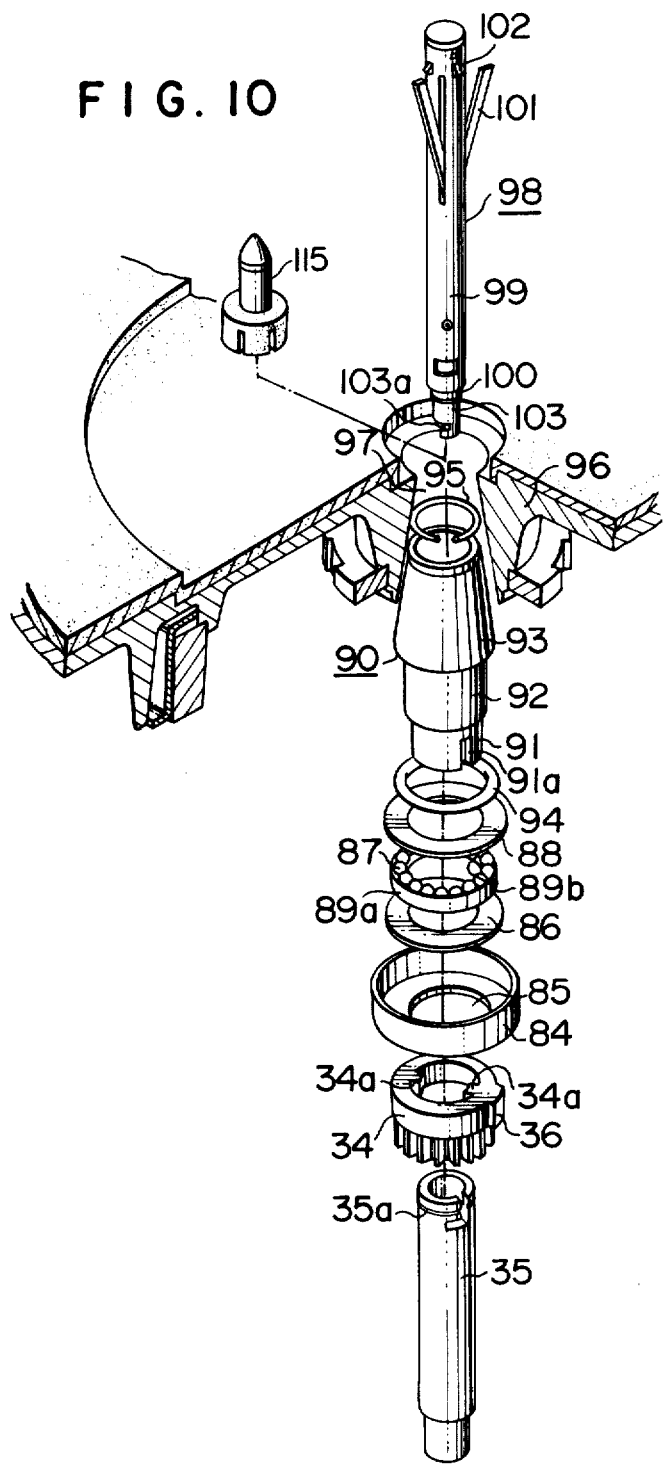
FIG. 10 is an exploded, perspective view showing the spindle mounting portion of FIG. 9.

Although not illustrated in detail in the drawings, a direct-drive type motor M directly rotates the turntable 96 due to the magnetic force generated between the stator portion surrounding the rotary shaft 90 and the rotor portion provided on the undersurface of the turntable 96 when the motor M is energized. Shown at 115 in FIG. 10 is a manual spindle which may be mounted in place of the changer spindle 99 when the record-playing of a single record disc is played.

With the aforesaid embodiment, when the starting lever 1 is manipulated so as to rotate in the direction of the arrow A, then the starting cam 3 mounted on the starting lever shaft 2 is rotated likewise, so that the first starting plate 12 is pivoted causing it to slide in the direction of arrow D, while the second starting plate 13 slides as well. This causes the projection 18 on the second starting plate 13 to abut the projection 19 formed on the repeating cam 14, thereby rotating the cam 14 in the arrow direction E. As a result, the index on a repeating knob 61 secured to the starting cam shaft 15 points at "1". When the cam 14 for setting the number of records discs is rotated in the arrow direction E, then the starting plate 16 slides in the arrow direction F so that the switch lever 20 rotatable about the shaft 23 is rotated in the arrow direction G. As a result, the sloped face 21 of the switch lever 20 urges the actuating portion of the switch 10 in the arrow direction M, the switch 10 is turned on, the motor M is rotated and then the turntable 96, rotary shaft 90 and small size gear 34 rotate in the arrow direction J.

Figure 3:
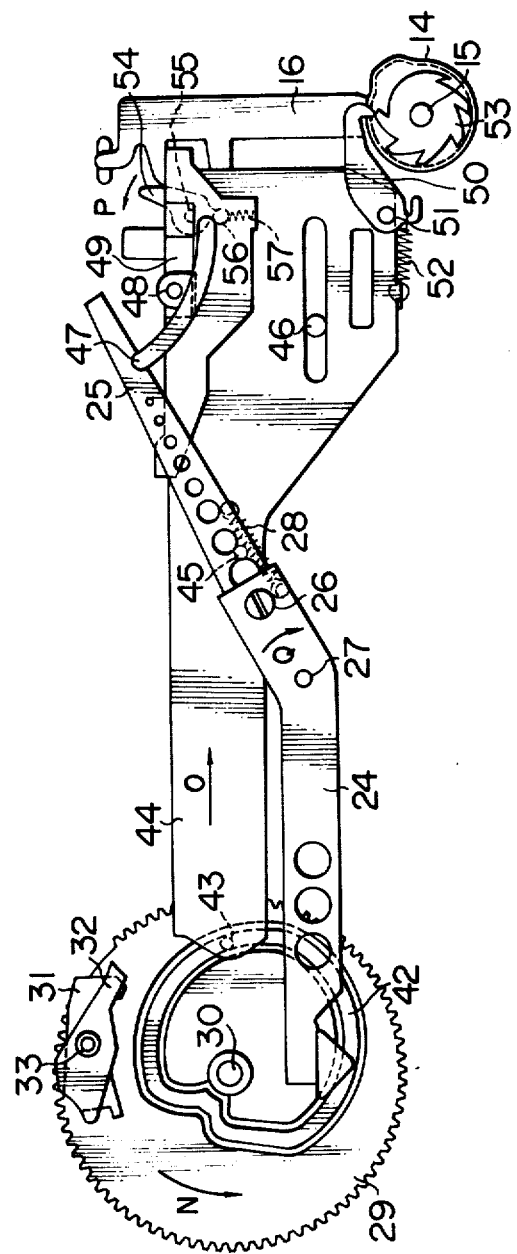

Simultaneously with the rotation of the starting lever 1 in the arrow direction A, the stop plate 6 slides in the arrow direction C along the stop guide 9 integral with the switch cover 8 by means of the projection 4 on the starting cam 3, so that the tip of the stop plate 6 is urged against the side of the starting spring 28. In this respect, the over-stroke or overshooting of the stop plate 6 is absorbed due to the deflection of the spring 28. Due to the starting spring 28 being urged, the first starting plate means 24 is rotated in the arrow direction H about the shaft 27, whereupon the second starting plate means 25 is rotated likewise. When the spring 28 is urged by the tip of the stop plate 6 and then the starting plate means 24, 25 are rotated in the arrow direction H, the starting link 31 and friction link 32 are rotated about the shaft 33 in the arrow direction I by means of the tip of the starting plate 24, so that the tip portion of the friction link 32 abuts the pawl 36 integral with the small size gear 34 which has been rotated in the arrow direction J, so that the large size gear 29 meshes with the small size gear 34, and in turn the large size gear 29 is rotated in the arrow direction N as shown in FIG. 3. The rotation of the large size gear 29 causes the drive plate 44 and sliding cam member 106 to operate. Firstly, description will be had of the operation of the sliding cam member 106.

Figure 4:
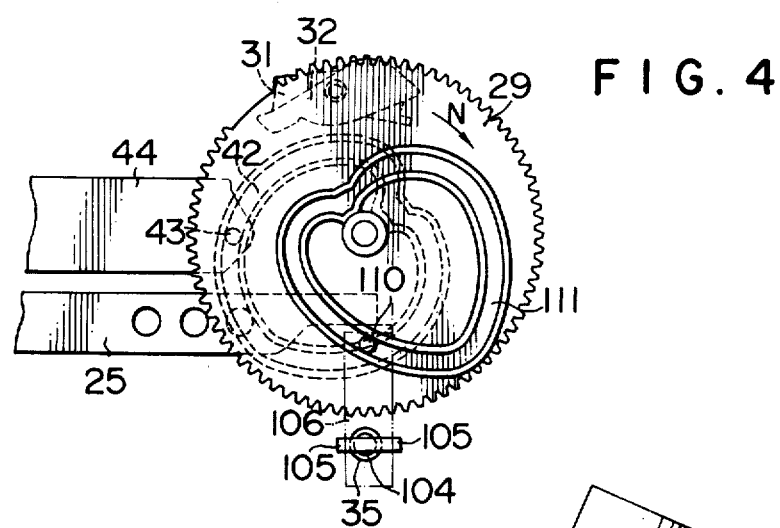
Figure 5:
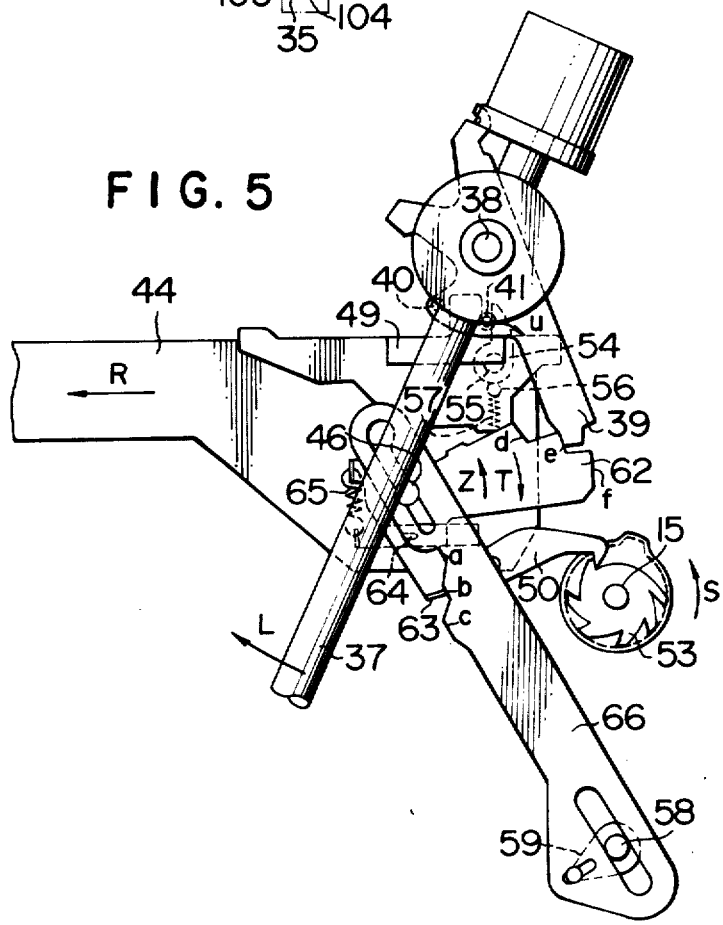
Figure 9:
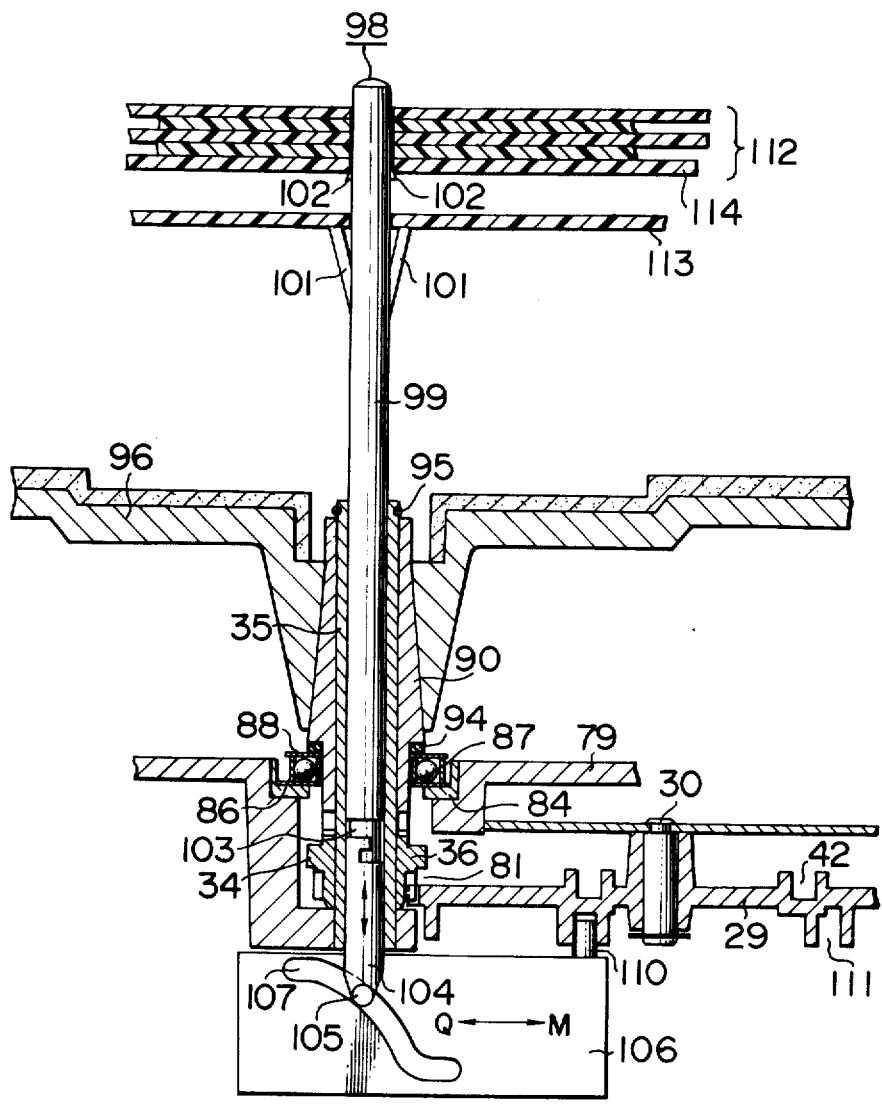
FIG. 9 is an outline of a vertical cross-sectional view of a changer-spindle-mounting portion and a mechanism for driving the spindle, illustrating the operation thereof.

Since the pin 110 on the sliding cam member 106 is inserted in the cam groove 111 defined in the large size gear 29, as shown in FIG. 4, the rotation of the large size gear 29 in the arrow direction N causes the sliding cam member 106 to first slide in the arrow direction Q in FIG. 9, being guided by the inner wall surface of the cam holder 108. As a result, the vertically movable shaft 104 engaged with the cam hole 107 in the sliding cam member 106 is moved downwards in FIG. 9. The downward movement of the vertically movable shaft 104 causes the spindle shaft 100 to be lowered to a small extent, which shaft 100 has been moved upwards so that the clamping pawl 102 which has been retracted into the spindle 99 and which serves to hold a stack of the record discs 112, projects from the spindle body 99 to hold the record disc which is lowermost except one, whereupon only the lowermost record disc 113 of the stacked record discs 112 is placed on the holder pawl 101 and held thereon. When the large size gear 29 is further rotated and the sliding cam member 106 slides in the arrow direction Q, then the vertically movable shaft 104 is lowered in the cam hole 107 in the sliding member 106 to a further extent. The downward movement of the vertically movable shaft 104 causes the spindle shaft 100 to be pulled downwards, and then the holder pawl 101 is retracted into the spindle body 99, so that the record disc 113 drops onto the turntable 96. When the large size gear 29 is further rotated, then the sliding cam member 106 slides in the arrow direction M, whereupon the vertically movable shaft 104 is moved to the left-hand end of the cam hole 107 defined in the sliding cam member 106. This then causes the spindle shaft 100 to be pushed upwards. In this case, the clamping pawl 102 is retracted into the spindle body 99 again, so that the record discs 112 are held by means of the holder pawl 101.

During one cycle of rotation of the large size gear 29, the record disc 112 which is lowermost except one is held by means of the clamping pawl 102 of the spindle 98, and then only the lowermost record disc 113 is held by means of the holder pawl 101, after which the holder pawl 101 is retracted into the spindle body 99, so the aforesaid record disc 113 drops onto the turntable 96, whereupon the holder pawl 101 projects from the spindle body 99 again and then the clamping pawl 102 is retracted into the spindle body 99.

The operation of the drive plate 44 which is operated simultaneously with the operation of the aforesaid sliding cam member 106 will next be described.

As shown in FIG. 3, the drive pin 43 on the drive plate 44 is inserted in the cam groove 42 defined in the large size gear 29, so that when the large size gear 29 is rotated in the arrow direction N, the drive plate slides in the arrow direction O, being guided by the shaft 45. This causes the pin 46 fixedly mounted on the drive plate 44 to urge the spring 28, so that the starting plate means 24, 25 rotate in the arrow direction Q to return to their home positions.

On the other hand, when the drive plate 44 slides in the arrow direction O, then the lift shaft 48 is raised upwards by means of the lift cam 49 formed on the drive plate 44, whereupon the lift 47 as well is raised upwards and the pickup 37 is also raised. Under such a condition, as has been described earlier, the starting setting plate 16 has been shifted in the arrow direction F by means of the repeating cam 14, so that the tip of the movable piece 54 pivoted to the drive plate 44 abuts the starting setting plate 16 and rotates in the arrow direction P. Furthermore, the connecting pawl 50 rotatable about the shaft 51 secured to the drive plate 44 goes over one tooth on the ratchet gear 53. In addition, in the process, in which the drive plate 44 is moved in the arrow direction O, the auxiliary plate 64 is urged in the same direction O, so that the index plate 62 connected through the medium of the spring 65 to the auxiliary plate 64 rotates about the shaft 46 in the arrow direction Z shown in FIG. 5. The index plate 62 continues to rotate in the arrow direction Z until the bent portion 63 formed on the index plate 62 abuts the shoulder portion $b$ of the selecting lever 66. The selecting lever 66 is so designed that it slides under the action of the selecting cam 69 by being guided by the shaft 46 and selecting knob shaft 58, so that when the selecting knob 60 points at a graduation of 17 cm, the bent portion 63 of the index plate 62 abuts the shoulder portion $c$ of the selecting lever 66. On the other hand, when the index plate 62 points at a graduation of 25 cm, then it abuts the shoulder portion $b$, and when the plate 62 points at a graduation of 30 cm, then it abuts the shoulder portion $a$, respectively. Meanwhile, if the sequence of the shoulder portions $a$, $b$ and $c$, is changed, the position of the selecting knob 60, which indicates the record size, may readily be changed.

In this manner, when the large size gear 29 rotates and thereby the drive plate 44 moves in the arrow direction O; then the starting plate means 24, 25 and stop plate 6 return to their home positions; the pickup 37 is raised upwards; the movable piece 54 rotates; the connecting pawl 50 goes over one tooth on the ratchet gear; and the index plate 62 rotates to a position commensurate with the size of the record disc to be played. When the large gear 29 further rotates, then the drive plate 44 moves in the arrow direction R, the movable pin 41 is urged by means of the movable piece 54 and the pickup arm 37 is rotated in the arrow direction L. When the pickup movable plate 39 abuts the shoulder portion $e$ of the index plate 62, then the pickup arm 37 can no longer rotate and it comes to rest in this position. When the drive plate 44 is further moved in the arrow direction R, the movable piece 54 roates in the arrow direction U, and the index plate 62 rotates in the arrow direction T. Accordingly, the index plate 62 may be kept free from the movement of the pickup movable plate 39.

Meanwhile, when the pickup movable plate 39 is located by means of the index plate 62, if the size of the record disc is 17 cm, then the position of the rotating pickup movable plate 39 is limited by the shoulder portion $d$, and on the other hand, if the size of the record disc is 25 cm, the position of the rotating plate 39 is limited by the shoulder portion $e$. Further, if the size of the record disc is 30 cm, the position of the rotating plate 39 is limited by the shoulder portion $f$.

On the other hand, when the drive plate 44 moves in the arrow direction R, then the connecting pawl 50 moves in the same manner, so that the ratchet gear 63 is pulled so as to rotate in the arrow direction S to turn the indication of the knob 61 indicating the number of records to "0". Thereafter, the lift 47 is lowered by means of the lift cam 49, and then the pickup arm 37 is placed onto the record disc 113 placed on the turntable 96 to start record-playing.

Figure 2:
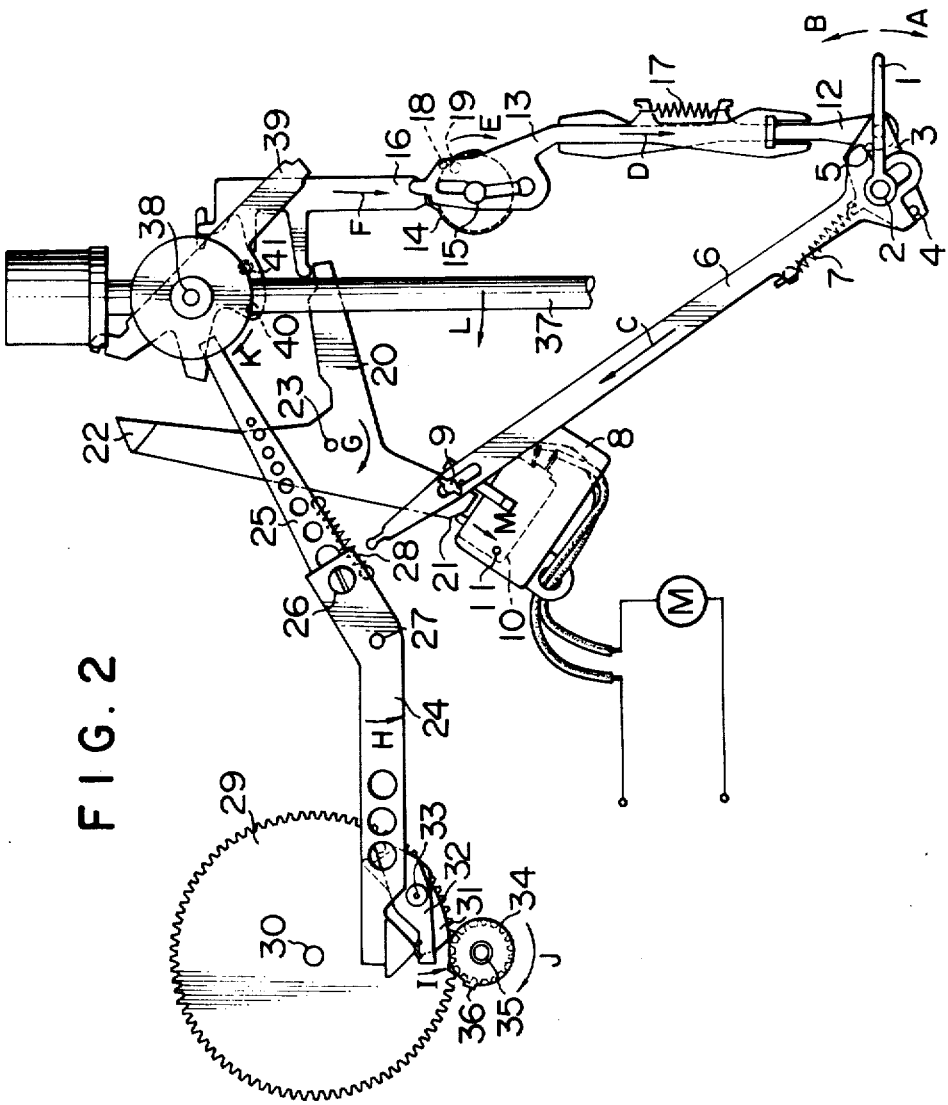
FIG. 2 through 7 are plan views illustrating the construction and operation of the automatic record player of FIG. 1.

During record-playing, the pickup arm 37 has been rotated in the arrow direction L, so that the starting pin 40 has been rotated in the arrow direction K in FIG. 2. Accordingly, upon completion of record-playing, the starting pin 40 urges the second starting plate means 25 in the arrow direction K, so that the first starting plate means 24 is rotated in the arrow direction H. As a result, the friction link 32 rotates in the arrow direction I to cause the large size gear 29 to start rotating.

When it is desired to interrupt the record-playing half-way, the starting lever I is rotated in the arrow direction B, so that the stop plate 6 slides in the arrow direction C by means of the projection 5 on the starting cam 3 to cause the large size gear 29 to start rotating.

When the large size gear 29 is rotated, then the drive plate 44 slides in the arrow direction O, so that the lift 47 is raised by means of the lift cam 49, so the pickup arm 37 is detached from the record disc.

Figure 6:
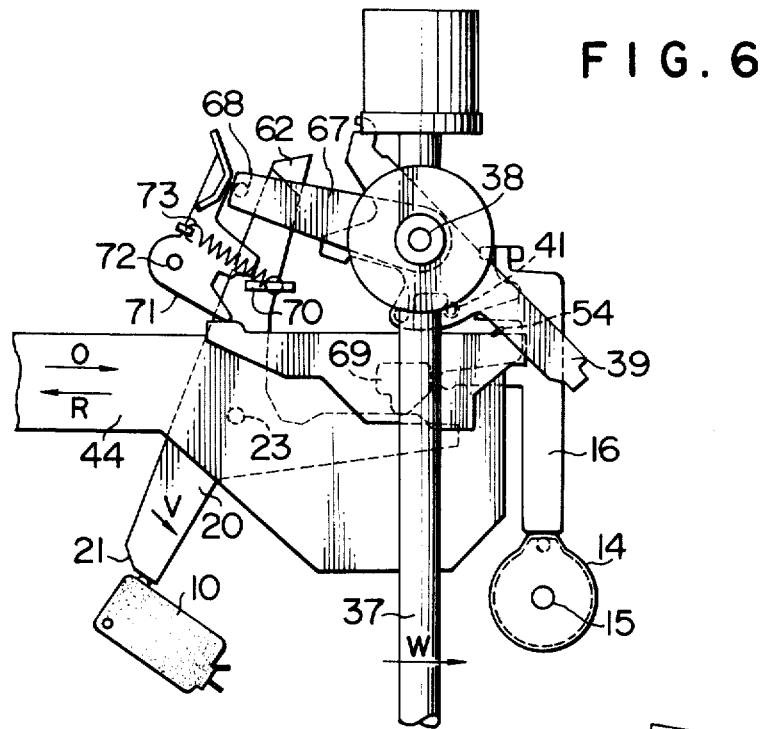

Since the projection on the drive plate 44, as shown in FIG. 6, urges the movable pin 41, the pickup arm 37 rotates in the arrow direction W to be returned to a receiving stand. In this respect, since the cam 14 for setting the number of record discs has been returned to the position shown in FIG. 6, the movable plate 54 will not abut the starting-setting plate 16 nor rotate as in the case of starting the record-playing. As a result, even when the drive plate 44 slides in the arrow direction R, the movable piece 54 will not abut the movable pin 41, and hence the pickup arm 37 remains in its returned position. Then, when the drive plate 69 further slides in the arrow direction R, the cam portion of the switch lever 20 is released from being retained by the slide piece 69 provided on the drive plate 44, so that the switch lever 20 is rotated in the arrow direction V, thereby turning off the switch 10. This then causes the motor M to stop, and the turnable 96 stops.

Simultaneously with the sliding of the drive plate 44 due to the rotation of the large size gear 29, the sliding cam member 106 slides as well. The sliding direction of the cam member 106 first takes place in an arrow direction Q in FIG. 9, as has been described earlier, and then in an arrow direction M, thus changing in two stages. Then, the spindle shaft 100 is first lowered through the medium of the vertically movable shaft 104, and then raised upwards. The up and down movements of the spindle shaft 100 cause the clamping pawl 102 to project so as to hold the record disc which is lowermost except one, of a plurality of record discs 112 which have been placed on the holder pawl 101, and then the lowermost record disc 114 only is moved onto the holder pawl 101, after which due to the closure of the holder pawl 101, the record disc 114 drops onto the record disc 113 which has completed its play and been placed on the turntable 96.

When playing of the record disc 113 which has dropped on the turntable 96 is completed or when playing of the record is interrupted, rotation of the large size gear 29 is started, the pickup arm 37 is returned to its record-playing starting position, and the switch 10 adapted to energize the motor M is turned off, so that the turntable 96 stops its rotation, while a new record 114 is supplied from the spindle 98 onto the turntable 96.

Figure 7:
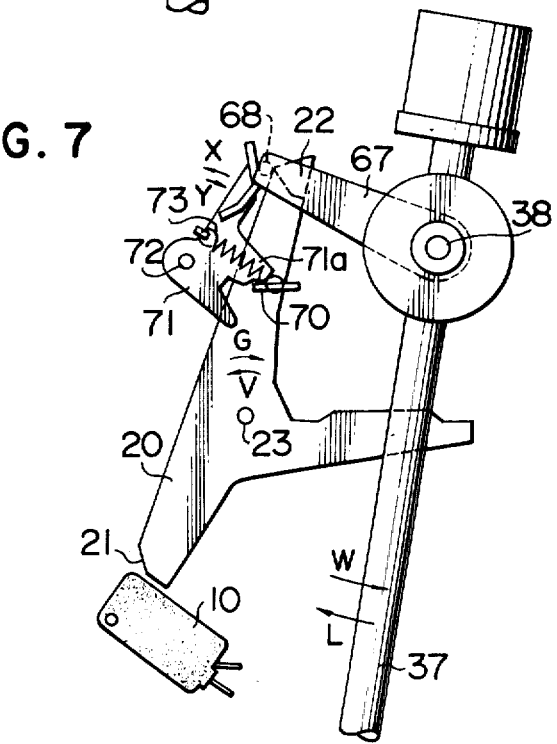

Meanwhile, when the pickup arm 37 is rotated in the arrow direction L manually, as shown in FIG. 7, then the pin 68 formed on the pickup fixing plate 67, which cooperates with the pickup, urges the projection 22 of the switch lever 20, so that the switch lever 20 rotates in the arrow direction G and hence the switch 10 is turned on. In addition, since the switch holding plate 71 adapted to rotate about the shaft 72 is rotated in the arrow direction Y under the action of the spring 73, the projection 70 of the switch lever 20 may be held by the shoulder portion 71a.

When the pickup arm 37 is manually returned in the arrow direction W, then the switch holding plate 71 is rotated in the arrow direction X by means of the pin 68, so that the projection 70 of the switch lever 20 is released from being retained thereby. This causes the switch lever 20 to rotate in the arrow direction V with the aid of the spring 73, and hence the switch 10 is turned off.

In case a plurality of record discs set on the spindle 98 are to be continuously played, the indication of the repeating knob 61 is set to one of the desired FIGS. 1 to 6, so that the ratchet gear 53 is set to a position corresponding to the desired figure, and then the ratchet gear 53 is turned backwards one tooth at a time after completion of every record-playing, by means of the connecting pawl 50, thus effecting continuous record-playing of a specified number of record discs.

Nevertheless, in case the record discs set on the spindle are 3 in number, despite the repeating knob 61 being set to a FIG. "6," the lowermost record disc and a record disc which is lowermost except one, are set to playing one by one, but the playing of a record disc, which is lowermost except two, has to be repeated four times.

On the other hand, in case a record disc set on the spindle is one in number, or in case the spindle 98 is removed, the manual spindle 115 is mounted instead and a single record disc is set on the turntable 96, then the cycle of repeated record-playing of the aforesaid single record disc may be set by means of the repeating knob 61. In other words, if the index of the repeating knob 61 is set to a desired figure out of FIGS. 1 to 6, the ratchet gear 53 is set to a position corresponding to the above specified figure, so that the ratchet gear 53 is turned backwards one tooth at a time after completion of every record-playing by means of the connecting pawl 50, thus effecting the repeated record-playing at a specified cycle.

In passing, the aforesaid embodiment refers to the case where the number of record discs to be played continuously is up to 6. However, the number of record discs to be repeated may readily be varied by changing the teeth of the ratchet gear 53. On the other hand, if the knob 61 for setting the number of the record discs is so designed as to select the teethdevoid portion of the ratchet gear 53, which is apart from the connecting pawl 50, a plurality of record discs which have been set on the spindle 98 may sequentially be played, after which the top record disc only may repeatedly be played at a desired cycle.

The embodiments, which have been described thus far, present the following features and advantages:

First, when the desired number of repetitions is set by the repeating knob 61 before playing, if a single record is put on the player, the record will be repeatedly played several times correspondingly to the set number and if a plurality of records are put on the player, records of the number corresponding to the set number will be sequentially played one by one and in both cases after completion of playing of the number of repetitions as set, the player automatically stops its operation without need of manipulation by an operator. Thus, the present invention much improves operational facility.

In addition, when by manipulating the repeating knob 61, the ratchet wheel 53 takes the position where the toothless portion of the wheel is engaged with the connecting pawl 50, in the case of a single record its playing will be permanently repeated and in the case of a plurality of records set around the spindle 98 the desired number of records will be sequentially played one by one and, after completion of playing of the desired number of records, the uppermost one of the records stacked upon the turntable will be repeatedly played until the player is manually stopped.

Further, when the repeating knob 61 is set at any one of the positions other than the "0" position without manipulating the starting level 1, the startsetting plate 16 operates the switch lever 20 to turn on the motor switch 10 so that the turntable 96 rotates without being followed by operation of the automatic mechanisms, thereby making it possible to conveniently check the number of rotations of the turntable.

Furthermore, since upon manipulating the starting lever 1 to the starting side, the repeating knob 61 changes its position from the "0" position to the "1" position, it can be seen immediately from the change of position of the repeating knob 61 whether the starting manipulation has been effectively conducted.

Second, since the drive force by the starting lever 1 is transmitted through the stop plate 6 and the tension spring 28 to the starting plate means 24, the over-stroke of the stop plate 6 may be effectively absorbed due to deflection of the spring 28.

Third, since the index plate 62 is so designed as to abut the side of the selecting lever 66, the selecting lever 66 will not be inadvertently translated due to the rotation of index plate 62, and the index plate may be positively located in position. In addition, it is preferable from the viewpoint of design that the positions for switching record sizes may be optionally changed by changing the order of the shoulder portions a, b, c which are formed on the side face of the selecting lever 66.

Fourth, the present design wherein two cam grooves, i.e., the cam groove 42 for the drive plate 44 and the cam groove 111 for the sliding cam member 106, are formed on opposed faces of the large gear 29 respectively is simpler in construction and more reliable in operation as compared with a design in which two cam grooves are formed on one of opposed faces of the large gear.

Fifth, since the switch 10 is operated by means of the switch lever 20, a single switch may be used for driving the motor. In addition, the switch may be readily mounted on the stationary base plate. This arrangement is safe and advantageous in that the motor circuit and its mechanism become simple in construction.

Sixth, since the turntable 96 is designed in such a manner that its rotary shaft 90 is supported by a thrust bearing 87 disposed above the lowermost end thereof, the height of the record player may be reduced to a great extent as compared with the height of prior players in which the lowermost end of the rotary shaft is supported; consequently, smooth rotation of the turntable 96 is ensured. In addition, since the turntable 96, rotary shaft 90 and pinion 34 are fabricated separately and thereafter assembled into a single component, the accuracy with which pinion 34 can be manufactured is much improved as compared with prior devices in which these three parts have been fabricated as an integral body, or the rotary shaft 30 and pinion 34 have been fabricated as an integral body and thereafter assembled together with a separate turntable into a single component. If the pinion 34 is made of synthetic resin, the cost of manufacture may be reduced to a great extent because it may be manufactured by the mass production system. Furthermore, if the pinion is made of a metal having high wear resistance, such as sintered alloys, the service life of the pinion 34 may be prolonged. Still furthermore, this design is advantageous from an economical viewpoint since only the pinion 34 may be exchanged instead of exchanging all parts of the turntable as needed.

While the present invention has been described herein with reference to certain exemplary embodiments thereof, it should be understood that various changes, modifications, and alterations may be effected without departing from the spirit and the scope of the present invention, as defined in the appended claims.

What is claimed is:

1. An automatic record player comprising:
   a pickup arm;
   a turntable;
   a motor for driving said turntable;
   a switch for energizing said motor;
   an automatic record-playing mechanism which automatically brings said pickup arm to a position from which record-playing starts and returns said pickup arm to its home position upon completion of record-playing and optionally a record changer mechanism which automatically operates to place a plurality of records one by one onto said turntable every time each record-playing is completed;
   a drive member adapted to be driven by said turntable to reciprocate for operating said record-playing mechanism and said record changer mechanism;
   a repeating mechanism including a cam adapted to be set to several positions each corresponding to the number of times a single record is to be played and/or the number of records desired to be played sequentially, a repeating knob for setting said cam to one of said several positions and indicating said number corresponding to the position of said cam as set, a ratchet wheel turning in unison with said cam and having teeth arranged in corresponding relation with positions of said cam, and a connecting pawl mounted on said drive member and adapted to engage with one of the teeth of said ratchet wheel to turn the ratchet wheel towards its original position, at which said cam is at the "0" position, by one tooth pitch for each reciprocation of said drive member;
   a starting mechanism including a starting lever, means cooperated with said starting lever for establishing the driving connection between said turntable and said drive member, means cooperated with said starting lever for turning said cam from a position at which said number is 0 to a position at which said number is 1, a start-setting member in response to said cam to be set to a first position when said cam is set to the 0 position or to a second position when said cam is set to positions other than 0, and a switching lever in response to said start-setting member for turning on said switch when said start-setting member is set to said second position and turning off said switch when said start-setting member is set to said first position;
   means for releasing the driving connection between said turntable and said drive member when each one reciprocation of said drive member is completed;
   means in response to said pickup arm for establishing the driving connection betweeen said turntable and said drive member each time said pickup arm is brought to a position at which one cycle of record-playing is completed;
   said automatic record-playing mechanism including a pickup arm displacing member mounted on said drive member and adapted to engage with said pickup arm in a course of each reciprocation of said drive member only when said start-setting member is at said second position for displacing said pickup arm from its home position to its record-playing starting position and means mounted on said drive member and adapted to engage with said pickup arm in another course of each reciprocation of said drive member for returning said pickup arm to its home position.

2. An automatic record player as set forth in claim 1, wherein said ratchet wheel has a toothless portion, whereby when said repeating knob sets said ratchet wheel such that said toothless portion is engaged by said connecting pawl, said ratchet sheel is kept unturned, thereby permanently repeating cyclic operations of said automatic record-playing mechanism.

3. An automatic record player as set forth in claim 1, further comprising means cooperating with said pickup arm for operating said switch lever independently of the first position of said start-setting member to switch on said switch when said pickup arm is displaced from its home position toward its record-playing starting position and to switch off said switch when said pickup arm is displaced toward its home position.

4. An automatic record player as set forth in claim 3, wherein said pickup arm displacing member is pivoted on said drive member to alternate between a first position at which said displacing member engages with said pickup arm in said course of each reciprocation of said drive member or a second position at which said displacing member is out of engagement with said pickup arm during reciprocation of said drive member, said pickup arm comprises means for turning said displacing member from said first position to said second position when said pickup arm has been brought to its record-playing starting position from its home position in accordance with the return movement of said drive member, and said start-setting member comprises means adapted to engage with said displacing member when said drive member approaches the end of the advance movement thereof and only when said start-setting member is set to said second position for turning said displacing member from said second position to said first position.

5. An automatic player as set forth in claim 4, wherein said automatic record-playing mechanism further comprises means for momentarily stopping said pickup arm when said pickup arm has been brought to its record-playing starting position from its home position, said displacing member being turned to said second position from said first position therof in response to stopping of said pickup arm in the return movement of said drive member.

6. An automatic record player as set forth in claim 5, further comprising a record-size-selecting mechanism for selecting the record-playing starting position in accordance with the size of a record to be played, whereby said pickup arm is momentarily stopped at said record-playing starting position selected by said record-size-selecting mechanism.

* * * * *